United States Patent [19]
Turner

[11] 4,014,127
[45] Mar. 29, 1977

[54] FISHING APPARATUS

[76] Inventor: Lenord H. Turner, 387 3rd St. North, Cocoa, Fla. 32931

[22] Filed: June 9, 1975

[21] Appl. No.: 585,196

[52] U.S. Cl. .................................. 43/27.4; 43/20; 43/21.2; 43/24
[51] Int. Cl.² ........................................ A01K 97/10
[58] Field of Search .......... 43/27.4, 43.12, 4, 21.2, 43/15, 16, 17, 19.2, 120; 254/190 R, 190 A, 190 B, 191, 192; 308/190, 233, 191

[56] References Cited
UNITED STATES PATENTS

| | | | |
|---|---|---|---|
| 1,116,721 | 11/1914 | Meder | 43/24 |
| 2,199,861 | 5/1940 | Sebrean et al. | 43/24 |
| 3,417,502 | 12/1968 | Thomas | 43/27.4 |
| 3,619,931 | 11/1971 | Brummett | 43/15 |
| 3,729,849 | 5/1973 | Richard | 43/17 |

FOREIGN PATENTS OR APPLICATIONS 9,551 4/1914 United Kingdom .................. 43/24

*Primary Examiner*—Warner H. Camp
*Attorney, Agent, or Firm*—Duckworth, Hobby, Orman, Allen & Pettis

[57] ABSTRACT

A heavy duty fishing reel apparatus having a line-receiving reel rotatably attached to a frame. An extending member is pivotally attached to the frame, and an elastic restraining device, which is attached between the distended portion of the extending member and the frame provides an adjustable restoring force in response to the rotation of the extending member about its pivot axis. A sealed bearing pulley device having a simplified line-guiding wheel and rotational bearing assembly is pivotally attached to the distended portion of the extending member.

15 Claims, 3 Drawing Figures

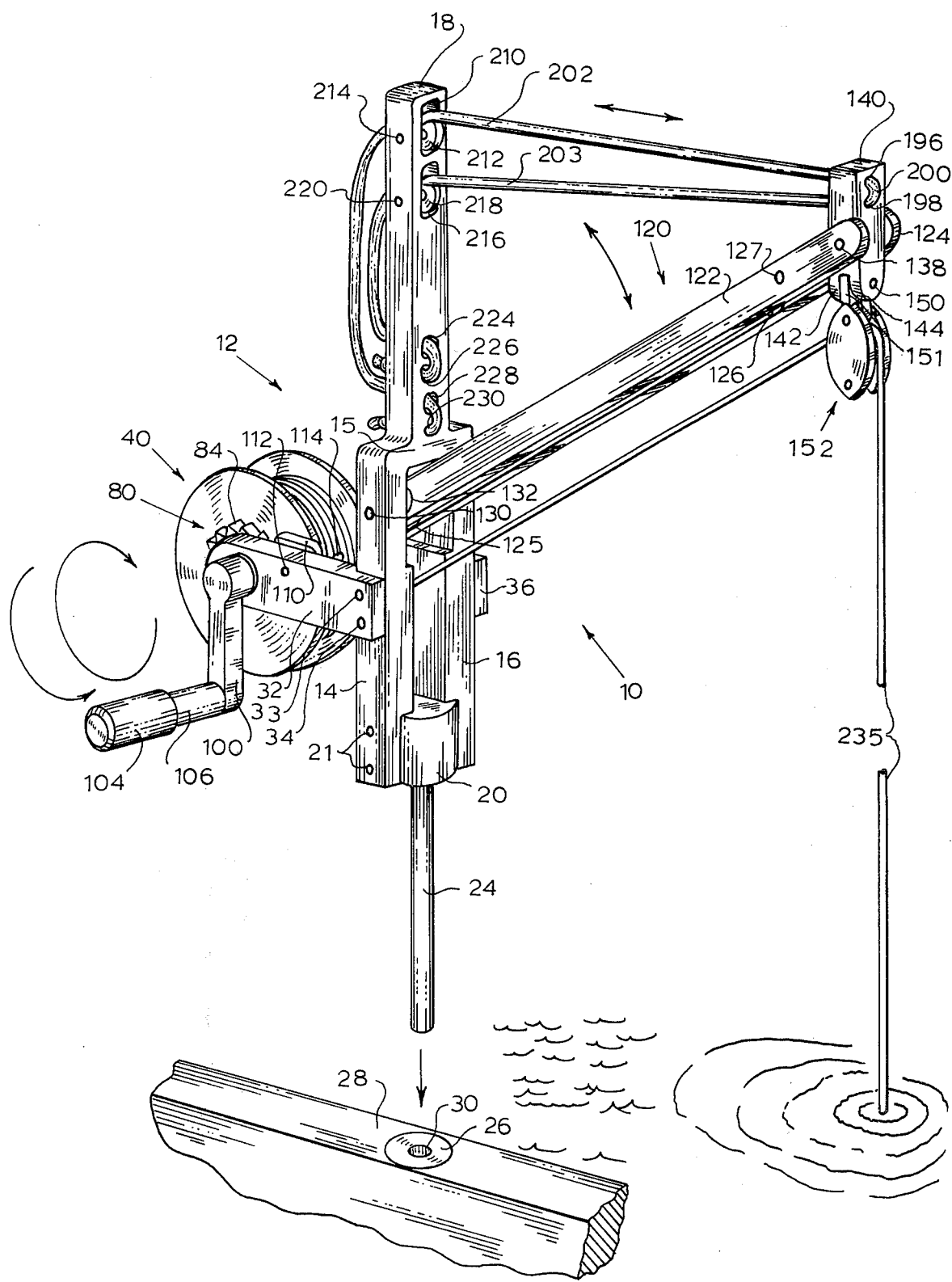

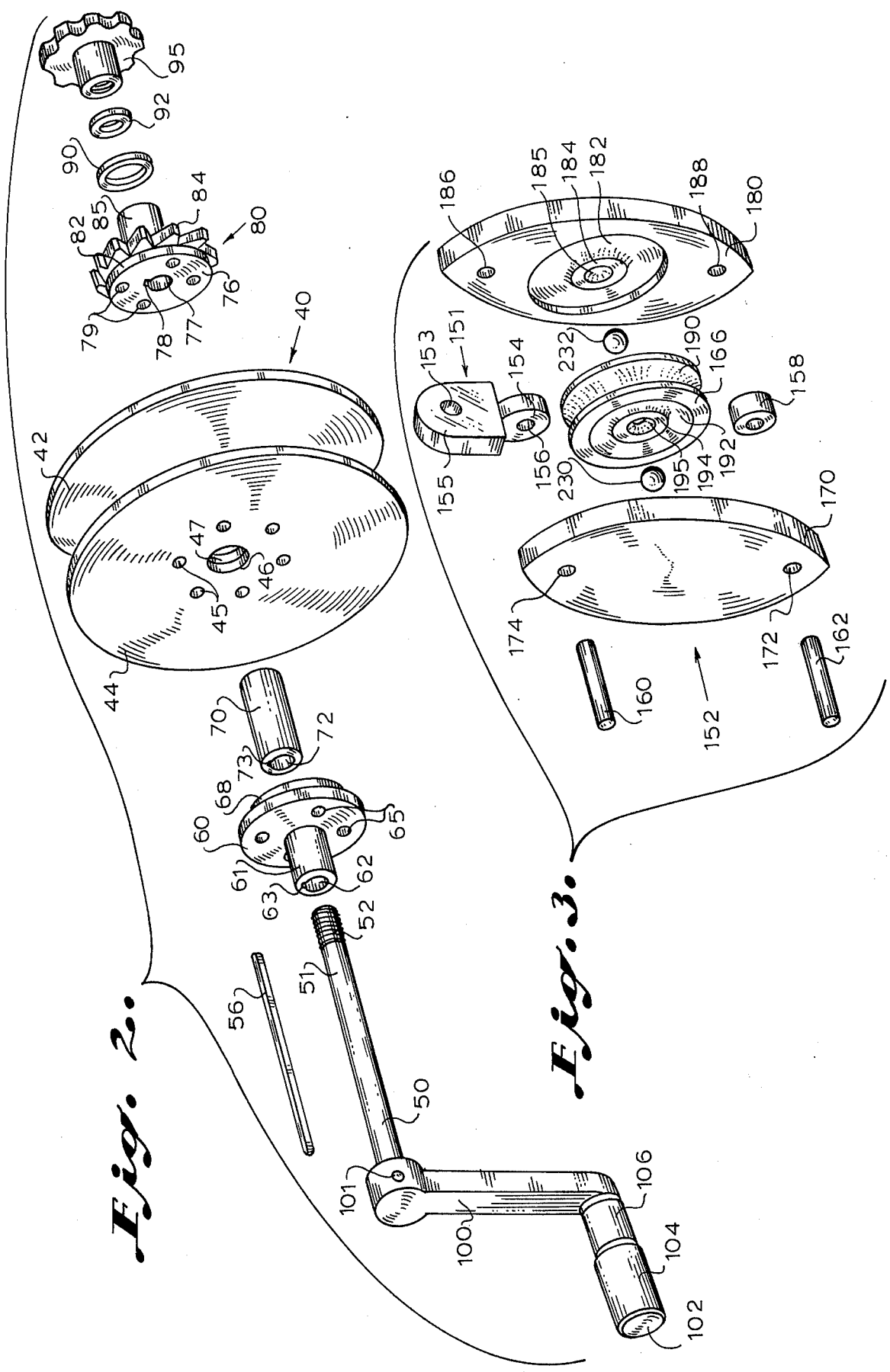

FISHING APPARATUS

BACKGROUND OF THE INVENTION

1. Field of the Invention

The present invention relates to rod and reel combinations and in particular to a commercial-type heavy duty fishing apparatus of the type generally attached to boats for catching large fish.

2. Description of the Prior Art

Heavy duty rod and reel combinations are well known in art. Examples of these commercial-type fishing devices generally utilize a line receiving reel rotatably attached to a frame which also serves as an extending rod or at least a portion thereof. These devices generally employ a pulley attached at the distended end of the rod for guiding the fishing line. The extended arms are generally constructed of a high strength, resilient material which deforms in response to large tension forces exerted upon the fishing line.

In U.S. Pat. No. 2,030,875, Johnson discloses a hand driven fishing apparatus utilizing a "T" frame having a pulley device attached to one arm of the T and a device for rotatably attaching the base to the side of a boat. Clapp in U.S. Pat. No. 3,049,829 and Berry in U.S. Pat. No. 3,835,571 improve upon the prior art by substituting a deformable extension rod for the fixed T frame and adding a motor to drive the line receiving reel. Thomas in U.S. Pat. No. 3,417,502, Rieth in U.S. Pat. No. 3,614,016 and King in U.S. Pat. No. 3,844,058 retain the deformable extension rod and pulley combination but incorporate handle cranks for driving the line receiving reels.

Each of the aforementioned rod and reel combinations were designed for a particular purpose, and have several common disadvantages. First, when a heavy weight is attached to the fishing line the resulting deformation of the rod causes the distended end of the rod to move inward toward the mounting position, thus making more difficult the task of keeping the line and catch separated from the side of the boat. Second, none of the aforementioned inventions discloses a method for adjusting the lateral displacement of the line toward or away from the boat attachment point. Third, when a deformable material is used in forming the extension rod the degree of deformation per unit of line tension cannot be varied in response to normal operational requirements.

In contrast to the aforementioned patents, the present invention discloses a heavy duty fishing rod and reel combination having an extension arm which may be adjusted for the desired lateral displacement from the boat without the need of rotating the apparatus on its pivoted mounting. Also, when a load is added to the fishing line attached to the present invention the vertical section of the fishing line moves outward and away from the boat to prevent possible fouling or tangling of the line by the boat. The present invention also discloses a restraining device having an adjustable linear restoring force which can be adjusted for minimum angular displacement of the extending rod for even the heaviest line tension forces. The design of the applicant's fishing rod and reel device provides a superior method for absorbing the transient variations in line tension due to wave action and intermitant fouling of the line with bottom objects. The present invention also includes a pulley device having a combined line-guiding wheel and rotational bearing assembly which effectively seals the rotational bearing surfaces from external contaminants.

SUMMARY OF THE INVENTION

The present invention contemplates a heavy duty fishing rod and reel apparatus comprising in combination a frame, a line receiving reel means rotatably attached to the frame, a means for rotating the line receiving reel means, and an extending member means pivotally attached to the frame. An adjustable elastic restraining means for providing a restoring force in response to a displacement is attached to the frame and to the extending member means. A simplified sealed bearing pulley means for guiding the fishing line is coupled to the distended end of the extending member means. In addition, the present apparatus provides a locking means for controlling the rate of input or output of line from the reel means. A means for movably attaching the frame to another structure, such as a boat, is also provided.

THE DRAWINGS

Other objects, features and advantages of the present invention will be apparent from the written description and drawings in which:

FIG. 1 is a frontal perspective view of a preferred embodiment of a heavy duty fishing rod and reel combination;

FIG. 2 is an exploded, perspective view of the line receiving reel means, the attached handle and rachet devices;

FIG. 3 is an exploded, perspective view of the sealed bearing pulley means.

DETAILED DESCRIPTION

An embodiment of the heavy duty fishing rod and reel combination in accordance with the present invention will now be described with reference to FIGS. 1 through 3 of the drawings.

With specific reference to FIG. 1, the heavy duty fishing rod and reel combination 10 has a generally "U" shaped frame 12 which is fabricated of a high strength metal such as aluminum. The frame 12 has lower parallel elements 14 and 16 which join at a neck section 15 which connects with a vertical arm section 18. A connective member 20 communicates between the extremities of the frame elements 14 and 16. Connective member 20 has a generally cylindrical shape with two diagonally opposite rectangular slots and is adapted to couple with frame elements 14 and 16 by threaded bolt pairs 21. Bolts 21 communicate between frame element 14, through the connective member 20 to threadedly couple with the frame member 16. The connective member 20 is mounted coaxial with the axis of "Y" frame 12. A pivot rod 24 having a generally cylindrical shape is coaxially mounted to the connective member 20 by ordinary means. The end of pivot rod 24 may be recessed into the connective member 20 to provide additional strength.

A connecting base element 26 having a generally cylindrical shape and manufactured from a high strength metal is permanently attached by ordinary means to a boat member 28 or another fixed element which may serve as a foundation. A bearing sleeve 30 fabricated of a solid lubricant impregnated polymer (such as polytetra fluoroethylene) is coaxially mounted in the base 26. The outside diameter of the pivot rod 24 is predetermined to slidably fit within the bearing sleeve 30 of the base 26. This communication provides a rotatable coupling which allows the entire fishing rod and reel assembly 10 to be rotated to a position inside or outside the boat foundation 28.

A reel mounting member 32 is perpendicularly attached to the frame Y element 14 intermediate the neck section 15 and the connective member 20 by mounting bolts 33 and 34. A similar reel mounting member 36 is positioned parallel to the reel mounting member 32 and attached in a similar manner to the frame Y element 16.

A line receiving reel 40 is rotatably attached between the reel mounting members 32, 36 at their distended ends. With reference to FIG. 2, the line receiving reel assembly has a reel shaft 50 having a threaded section 52 at one thereof and a keyway 51 intermediate its ends. A polymer bearing washer 68 is coupled to pressure plate 60 by screws 65. A coaxial, cylindrical section 61 is integrally attached to the pressure plate 60 and has a coaxially located cylindrical bore 62 and keyway slot 63 communicating therethrough.

The line receiving reel 40 is composed of a central cylinder having two annular flange sections 42 and 44 attached at either end thereof by screws 45. A coaxially located center bore 46 communicates within reel 40 between the annular flange end sections 42 and 44. A generally cylindrical shaft sleeve 70 having a center bore 72 and a keyway slot 73 communicating between its ends, slidably fits within the center bore 46 of line receving reel 40. Multiple solid lubricant impregnated polymer (such as polytetra fluoroethylene) inserts 47 are provided between the cylindrical bore 46 of the line receiving reel 40 and the shaft sleeve 70 to reduce sliding friction. The shaft sleeve 70 has a width equal to the width of line receiving reel 40.

A polymer bearing washer 76, having a coaxial bore 77 and keyway 78 communicating between its ends, is attached to rachet gear 80 by screws 79. Rachet gear 80 is composed of cylindrical section 85, having a coaxial, cylindrical bore and a keyway communicating between its ends, and an annular ring section 82 having multiple rachet teeth 84 located circumferentially thereon.

The line receiving reel device described above is assembled by inserting the key 56 in the keyway 51 of the reel shaft 50 and then inserting the threaded end 52 of the reel shaft 50 through the center bore 62 of the pressure plate 60 and the bearing washer 68, through the center bore 72 of shaft sleeve 70 and through the center bore 77 of the bearing washer 76 and the rachet gear 80. The cylindrical section 61 of the pressure plate 60 slidably fits within an access hole in the reel mounting member 32. Likewise, the cylindrical section 85 of rachet gear 80 slidably fits within an access hole in the reel mounting member 36. Friction between these sliding surfaces is reduced by inserting a solid lubricant impregnated polymer (such as polytetra fluoroethylene) collar therebetween. A first polymer bearing washer 90 slidably fits over the cylindrical section 85 of the rachet gear 80. A second polymer bearing washer 92 slidably fits over the threaded portion 52 of reel shaft 50. An end knob 95 couples with the threaded section 52 of the reel shaft 50, and thereby exerts a compression force on the second bearing washer 92.

It is understood of course that the key 56 which rests in the keyway 51 of the reel shaf 50 must be aligned with the keyway 63 of the pressure pad 60, the keyway 73 of the shaft sleeve 70, the keyway 78 of bearing washer 76, and the rachet gear 80 to provide a unitary rotation of these parts.

A hand driven crank 100 is attached by a screw 101 to the reel shaft 50 at the end opposite the threaded section 52. Cylindrical sections 104 and 106, which are made of a polymer material, rotate independently about a handle shaft 102 to form a gripping surface for the hand rotation of the handle 100 and the attached reel shaft 50. It is of course understood that the handle 100 and the reel shaft 50 may be reversibly inserted into either the reel mounting member 32 or the reel mounting member 36 to provide a handle location convenient for either a right-handed or in the alternative, a left-handed operator. It is also obvious that a second crank similar to the handle crank 100 could be attached to the threaded end 52 of the reel shaft 50 to provide for simultaneous right-handed and left-handed cranking.

The tightening of the end knob 95 onto the threaded portion 52 of the reel shaft 50 causes the bearing washer 68 to abut against the annular surface 44 of the line receiving reel 40.

Similarly, the bearing washer 76 abuts the annular surface 42 of the line receiving reel 40. The pressure plate 60, the bearing washer 68, the shaft sleeve 70, the bearing washer 76 and the rachet gear 80 are all engaged by the key 56 riding in the keyway 51 of the reel shaft 50 and therefore the assembly turns as a unit. However, the line receiving reel 40 rotates freely about the shaft sleeve 70 except for the rotation resistance provided by the bearing washer 68 pressing against the annular surface 44 thereof and the bearing washer 76 pressing against annular surface 42 thereof. Thus, this arrangement acts like a slip clutch, with the tightening of the end knob 95 causing increased rotational friction between the bearing washers 68 and 76 and the line receiving reel surfaces 44 and 42. End knob 95 is adjusted so that the line receiving reel 40 rotates as a unit with the reel shaft 50 and the handle crank 100 until the force exerted on the handle crank approaches the tensile strength of an attached fishing line 235. When a greater force is applied, the line receiving reel 40 rotates independently on the shaft sleeve 70 to prevent the breakage of the attached fishing line.

With reference to FIG. 1, the rachet teeth 84 of the rachet gear 80 engages a rachet locking member 110 which is pivoted about a mounting screw 112. A rachet locking pin 114 prevents the rachet locking member 110 from rotating in one direction about its mounting screw 112, which in turn prevents the rachet wheel 80 and the line receiving reel 40 from rotating in the same direction about the reel shaft 50. The rachet gear 80, the rachet teeth 84, the rachet locking member 110 and the rachet locking pin 114 are arranged in a well known manner to prevent the line receiving reel 40 from rotating in a direction which will cause the fishing line 235 to be disengaged therefrom. In a well known manner the rachet wheel 110 assumes a non-engaging mode when the line receiving reel 40 and the handle crank 100 are rotated in the opposite direction for spooling the fishing line 235.

An extending member 120 is composed of two identical parallel elements 122 and 124, and is separated near the distended end thereof by a cylindrical spacer element 126, which is fastened therebetween by screws 127. Extending elements 122 and 124 are separated at the opposite ends thereof by a cylindrical spacer 125. The extending member 120 is pivotally attached to the parallel elements 14 and 16 of the frame 12, immediately adjacent to the neck section 15 and on the side opposite reel mounting members 32 and 36, by a first pivot shaft 130. The first pivot shaft 130 communicates from the frame element 14, through the extending element 122, through the cylindrical spacer 125, through the extending element 124 and into the frame element 16. Multiple solid lubricant impregnated polymer washers (such as polytetra fluoroethylene) may be mounted on the first pivot shaft between the frame elements and the extending elements to reduce rotational friction. A solid lubricant impregnated polymer sleeve (such as polytetra fluoroethylene) may be inserted through the extending elements 122 and 124 and spacer 125 to further reduce rotational friction.

An end block 140 is mounted to the distended end of the extending member 120 by a second pivot shaft 138 which communicates from the extending element 122, through the end block 140, and through the extending element 124. Multiple solid lubricant impregnated polymer washers (such as polytetrafluoroethylene) are located on the second pivot shaft 138 between the extending elements and the end block to reduce rotational friction therebetween. At one end of the end block 140, opposing sides 142 and 144 are extended parallel to the plane of the second pivot shaft 138 leaving a rectangular void therebetween. A third pivot shaft 150 communicates between the end block sides 142 and 144 in a plane perpendicular to the second pivot shaft 138. A line attaching pulley 152 is attached to the third pivot shaft 150 by a connective piece 151.

With reference to FIG. 3, the connective element 151 is composed of a first planar surface 155 and a second planar surface 154 being perpendicular thereto. The first planar surface 155 contains a cylindrical bore 153 communicating between its faces and adapted to rotate about the third pivot shaft 150. The second planar surface 154 has a cylindrical bore 155 communicating between its faces and adapted to rotate about a fourth pivot shaft 160.

The line attaching pulley 152 is composed of two identical parallel plates 170 and 180. The second plate 180 has a first side containing a first annular void 182, a coaxial annular ridge 184 therein and a second coaxial annular void 185 therein. It will of course be understood that the hidden first side of first pulley plate 170 has a similar configuration. The second surface 154 of connective element 151 and a second spacer element 158 provide a predetermined separation between the opposing first sides of first and second pulley plates 170 and 180. The fourth pivot shaft 160 communicates from a first mounting hole 174 in the first pulley plate 170 through the annular bore 156 in the second surface 154 of the connective element 151 and terminates in a mounting hole 186 in the second pulley plate 180. The fourth pivot shaft 160 slidably fits within bore 156, thus allowing pulley assembly 152 to rotate therearound.

A generally cylindrical pulley wheel 166 has a diameter predetermined to slidably fit within first annular slots 182 in first and second pulley plates 170 and 180. This overlapping coupling restrains the rotation of pulley wheel 166 within first annular slots 182 and furthermore protects against external contaminants such as dirt, sand and salt water from reaching internal bearing surfaces. The two identical sides of pulley wheel 166 each have a first coaxial void 192, a coaxial annular ridge 194 located therein, and a second coaxial annular void 195 located therein. The shape of second annular voids 185 and 195 are predetermined to provide a sliding fit respectively with first ball bearing 230 and second ball bearing 232 retained between voids 185 and 195 of first and second pulley plates 170 and 180 when coupled therebetween. A moisture repelling grease is packed within first annular slots 182 of first and second pulley plates 170 and 180 and also in first coaxial voids 192 and second annular voids 195 of pulley wheel 166. This grease decreases the rotational friction between the bearing surfaces, and also adds further sealing protection from external contaminants. The pulley wheel 166 further has a recessed groove 190 about the circumferential thereof for guiding the transmission of the fishing line.

Referring now to FIG. 1, two parallel bores 196 and 198, one above the other in a plane parallel to the third pivot shaft 150, are located at the opposite end of end block 140. The rotation of the end block 140 and the extending member 120 is restrained by a restoring force provided by an elasticized, woven fiber cord 200, commonly known as rubber shock cord or "cord", which communicates with the end block 140 by first looping through the bore 196, then looping back through the bore 178.

A generally rectangular void 210 is located at the distended end of the vertical arm 18 and a generally rectangular void 216 is located immediately adjacent thereof in a direction toward the neck section 15 thereof. The axes of the voids 210 and 216 lie in a common plane which is perpendicular to the first pivot shaft 130 and parallel to the longitudinal axis of the frame 12. A first roller guide 212 is rotatably attached to a first shaft 214 which communicates between the sides of the void 210 of the vertical arm 18, in a plane parallel to the first pivot shaft 130. A second roller guide 218 is rotatably attached to a second shaft 220 which is parallel to the first roller shaft 214 and communicates between the sides of the rectangular void 216 of vertical arm 18.

Four cylindrical voids 224, 226, 228 and 230 are located in the vertical arm 18 of frame 12 immediately adjacent to the neck section 15 thereof with the plane of these four bores being perpendicular to the first pivot shaft 130.

First end 202 of restoring cord 200 is drawn over the first roller guide 212 and through the first rectangular void 210, runs parallel to the vertical arm 18, then is drawn through the cylindrical bore 228, and finally is looped through the cylindrical bore 230. Similarly, a second end 203 of the restoring cord 200 is drawn over the second roller guide 218, through the second rectangular void 216, runs parallel to the vertical arm 18, then through the cylindrical bore 224, and finally looped back through the cylindrical bore 226.

The length of restoring cord 200 may be adjusted by drawing more of ends 202 and 203 through their respective bores 224, 226, 228 and 230 located in vertical arm 18 of frame 12. Reducing effective cord length causes extending member 120 to rotate about its pivot shaft 130 so that end block 140 moves closer to vertical arm 18. This reduction in the effective length of cord 200 also reduces the rotation, for a given force, of extending member 120 about its pivot shaft 130 because the linear displacement per unit of force exerted on cord 200 is proportional to its length. Thus, the shorter effective cord length causes a reduced transient rotation of extending arm 120 per unit of force exerted thereon. Furthermore, restoring cord 200 generally has the inherent property of reaching a maximum length at a predetermined tension force and then retaining that length until the tension force increases to the point of cord failure. This property of cord 200 allows the operator to determine the maximum rotation of extending member 120 by varying the effective cord length. Roller guides 212 and 218 allow the effective length of cord 200 to be increased, thus producing an improved response of extending member 120 to transient displacement forces thereon, such as wave motion and the pitching and rolling of the boat foundation.

A heavy duty fishing line 235 is passed through the line attaching pulley 152, between the Y frame elements 14 and 16, and then, starting from the bottom, is coiled around the line receiving reel 40. When rachet device 110 locks line receiving reel 40 in place, the transient tension force on the fishing line 235 will cause a rotational displacement of the extending member 120 in a clockwise direction about pivot shaft 130. The extent of this rotation will be limited by the restoring force supplied by the restraining cord 200 and the quiescent position adjustment thereof.

All of the parts of the heavy duty fishing apparatus except the polymer elements, the restraining cord and the fishing line are manufactured from high strength aluminum or galvanized steel to prevent corrosion from environmental elements.

The operation of fishing apparatus 10 should be obvious in view of the foregoing descriptions and the drawing of FIG. 1. The fishing line 235 is lowered by grasping crank 100 by handles 104 and 106, and rotating counterclockwise as viewed in FIG. 1. The rachet mechanism 110 and 80 is adapted to restrict rotation in this direction and thus it first must be disengaged. The fishing line 235 is raised and wound upon reel 40 by rotating crank 100 in the clockwise direction. Rachet mechanism 110 and 80 will prevent unwinding of the line 235 in response to tension thereon.

It will be clear at this point that a fishing apparatus has been provided which overcomes some of the problems of the prior. art fishing devices while improving the over-all operation and convenience of the heavy duty fishing rod and reel combination. However, the invention is not to be construed as limited to the particular forms disclosed herein since these are to be regarded as illustrative rather than restrictive.

I claim:

1. A fishing apparatus comprising, in combination:
   a frame;
   reel means rotatably attached to said frame;
   means for rotating said reel means;
   an extending member pivotally attached to said frame;
   line guide means coupled to said extending member;
   elastic restraining means attached to said frame and to said extending member for providing a restoring force in response to rotation of said extending member relative to said frame, whereby said extending member smooths transient tension variations which occur when a fishing line is reeled or secured through said line guide means onto said reel means; and
   elastic restraining guide means rotatably attached to said frame for increasing the effective length of said elastic restraining means by movably folding said elastic restraining means thereover.

2. An apparatus as described in claim 1 wherein said reel means comprises a reel having an axial reel shaft therethrough, and bearing washer means therebetween.

3. An apparatus as described in claim 2 having said means for rotating said reel means coupled to said reel shaft.

4. An apparatus as described in claim 3 having slip clutch means of said reel shaft between said means for rotating said reel means and said reel for allowing independent rotation of said reel when rotational torque thereon exceeds a predetermined limit.

5. An apparatus as described in claim 4 having means for adjusting said predetermined torque limit of said slip clutch means.

6. An apparatus as described in claim 5 having a rachet means on said reel shaft for controlling the rotation of said reel means in one direction thereabout.

7. An apparatus as described in claim 6 having means attached to said frame for movably coupling said frame to another structure.

8. An apparatus as described in claim 1 having means for releasably attaching said elastic restraining means to said frame, whereby said restoring force of said elastic restraining means and the quiescent rotational position of said extending member may be adjusted.

9. An apparatus as described in claim 8 having an end means attached to said extending member for coupling said elastic restraining means to said extending member.

10. An apparatus as described in claim 9 wherein said line guide means pivotably couples to said end means.

11. An apparatus as described in claim 10 having said end means pivotally attached to said extending member.

12. The apparatus as described in claim 11 wherein said means for rotating said reel means comprises hand driven crank means which may be adapted for right-handed operation, left-handed operation, or simultaneous right-handed and left-handed operation.

13. An apparatus as described in claim 1 wherein said line guide means comprises a pulley having, in combination:
   a first plate having one side containing an annular void therein and a recessed area located inside said annular void;
   a second plate similar to said first plate and having one side containing an annular void therein and a recessed area located inside said annular void;
   spacer means attached between opposing sides of said first and second plates for providing a predetermined separation therebetween;
   a plurality of bearings; and
   wheel means, having a pair of faces and a predetermined diameter, rotatably connected between said one sides of said first and second plates in said annular voids of said first and second plates, said wheel means having a recessed groove about the circumference thereof, and each of said pair of faces on said wheel means having a first annular void and a recessed area therein, said bearings being located between said recessed areas of said wheel means and said recessed areas of said respective first and second plates, whereby said wheel means rotate on said bearings and within said sides to form a pulley.

14. The apparatus as described in claim 13 wherein said first annular voids of said wheel means contain therein a moisture resistant lubricant for reducing friction between said wheel means and said first and said second plates.

15. The apparatus as described in claim 13 wherein said recessed areas of said wheel means are located at the center of said first annular voids on a section of said wheel means raised relative to said first annular voids, and wherein said recessed areas of said first and said second plates are located at the center of said annular voids on a section raised relative thereto.

* * * * *